No. 873,199. PATENTED DEC. 10, 1907.
A. E. YOUNG & J. F. HINKLE.
BUCKLE.
APPLICATION FILED FEB. 25, 1907.
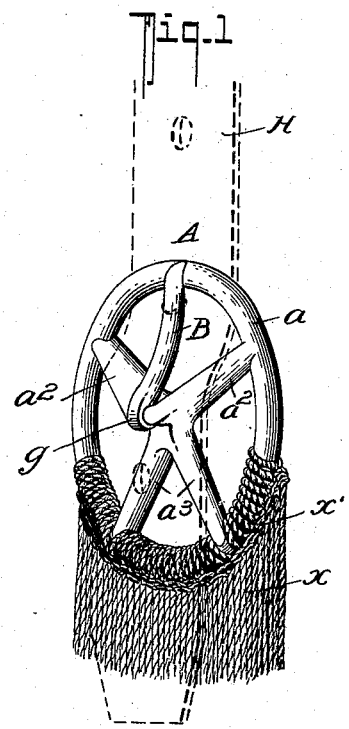
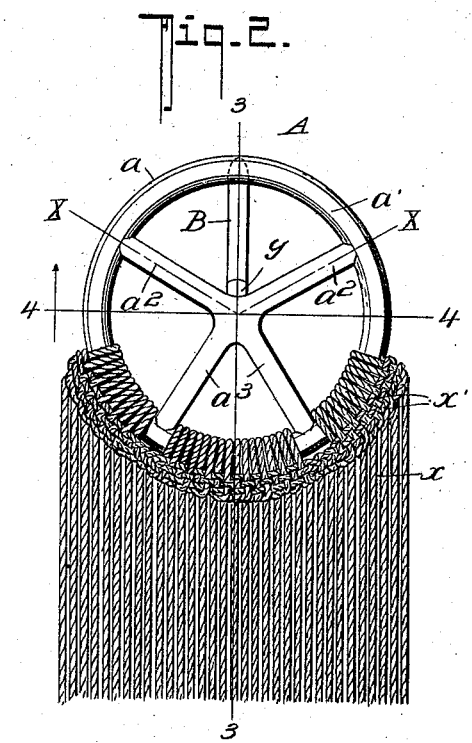
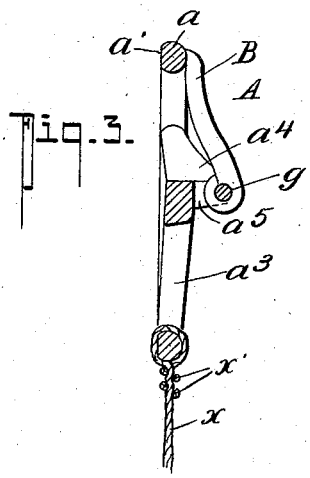
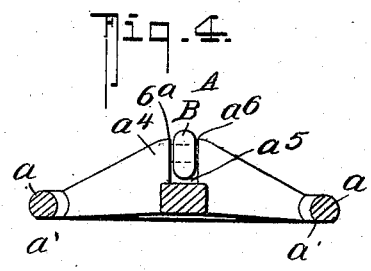
WITNESSES:
F. C. Gibson.
John T. Schrott.
INVENTORS
A. E. Young.
J. F. Hinkle.
BY
Fred G. Dieterich & Co.
ATTORNEYS

UNITED STATES PATENT OFFICE.

ANDREW E. YOUNG AND JAMES F. HINKLE, OF ROSWELL, TERRITORY OF NEW MEXICO.

BUCKLE.

No. 873,199.  Specification of Letters Patent.  Patented Dec. 10, 1907.

Application filed February 25, 1907. Serial No. 359,206.

*To all whom it may concern:*

Be it known that we, ANDREW E. YOUNG and JAMES F. HINKLE, residing at Roswell, in the county of Chaves, Territory of New Mexico, have invented a new and Improved Buckle, of which the following is a specification.

This invention seeks to provide an improved construction of buckle, of a simple and economical character, more especially adapted for use as a "cinch buckle", having the parts arranged for keeping the cinch rope or hair from gathering in the center of the buckle, and in which the several parts have such correlative arrangement, whereby to keep the buckle from spreading in case of the horse falling or in case of heavy pulls, such as frequently happens with cow boys, particularly when pulled off the saddle by the horse or in roping when pulling cattle out of bogs or quick sand.

Our invention also comprehends a novel arrangement of parts, whereby in use they do not gall or rub the horse and present no obstruction on the horse engaging surface, capable of scratching or otherwise injuring the animal.

In its more subordinate features, our invention consists in certain combination and peculiar arrangement of parts, which will hereinafter be fully explained, specifically pointed out in the appended claims, and illustrated in the accompanying drawings, in which:—

Figure 1, is a perspective view of our improved buckle with a portion of the cinch rope and the strap end attached, Fig. 2, is an inverted plan view thereof, Fig. 3, is a longitudinal section taken practically on the line 3—3 of Fig. 2. Fig. 4, is a cross section thereof on the line 4—4 of Fig. 2 and looking in the direction of the arrow.

In carrying out our invention, we make the buckle A preferably of circular shape, and, excepting the tongue B, of a single piece of suitable metal, and the inner face of the circular portion $a$ slightly flattened as indicated by $a'$, whereby the said inner face will lie in a plane substantially with the inner or under faces of the short radial bars or brace members $a^2$—$a^2$ and radial brace bars $a^3$—$a^3$ that are disposed approximately at right angles to the brace members $a^2$—$a^2$ as shown in Fig. 2, for reasons presently explained and the under faces of the several members $a'$— $a^2$ and $a^3$—$a^3$ are substantially in a plane with each other and with the lower or flattened faces of the circular portion, $a$, whereby to make the entire under faces of the buckle practically without obstruction so as to prevent the buckle from galling or rubbing the horse.

The bars $a'$—$a^2$ and $a^3$—$a^3$ are integral with the outer or circular portion $a$ whereby to uniformly brace the said circular portion and also keep the cinch rope or hair from drawing together at the center of the buckle, the said cinch rope being linked over the circular member $a$ at that side where the bars $a^3$ connect therewith, and it is thereby held in a lateral distributed condition by reason of the loops of the rope being wound upon the circular member or frame $a$ between and at each side of the said bars $a^3$, the said rope being also held from drawing together under a pull strain by a re-inforce or transversely interlaced thread $x'$ of the rope as clearly shown in Fig. 2.

The transverse bars $a^3$ at a point where they merge with the converging ends of the bars $a^2$, which is at a point centrally of the circular frame $a$, are vertically extended to form an outwardly projecting flange $a^4$, which flange at a point centrally of the circular member $a$ has an aperture $a^5$ and a recess $a^6$, the latter being in the outer face and in line with the aperture, the edges $6^a$ of the said recess serving as guides for holding the buckle tongue B from lateral movement, the eye $g$ of the said tongue being pivotally mounted in the aperture $a^5$ as shown, such arrangement providing for positively holding the tongue B at all times in a direct longitudinal line with the cinch rope whereby to secure the apertured end to the draw strap H and in a position to exert a direct strain on that side of the buckle ring diametrically opposite the side to which the cinch rope is attached.

Having thus described my invention, what I claim and desire to secure by Letters Patent, is:—

As an improvement in cinch buckles, the buckle body, consisting of an outer circular shaped frame, a transverse brace bar, a pair of other bars integrally joined with the transverse bar midway thereof and extending divergingly therefrom and integrally joined with the said frame, a cinch rope looped over the frame between and to each side of the ends of the divergingly opposing brace bars, said cinch rope having a re-inforce for holding the loops thereof in a uniformly spread position on the circular frame of the buckle, a transverse brace bar having a portion projected above the said frame at a point centrally thereof, said projected portion having an aperture and a recess, the latter being in line with the aperture, and a tongue pivotally engaging the said aperture and the recess, substantially as shown and for the purposes described.

ANDREW E. YOUNG.
JAMES F. HINKLE.

Witnesses:
  R. M. PARSONS,
  ALBERT HAMEY.